Feb. 29, 1944.   C. F. HAUCK   2,343,179
ABRASIVE MATERIAL
Filed May 15, 1941
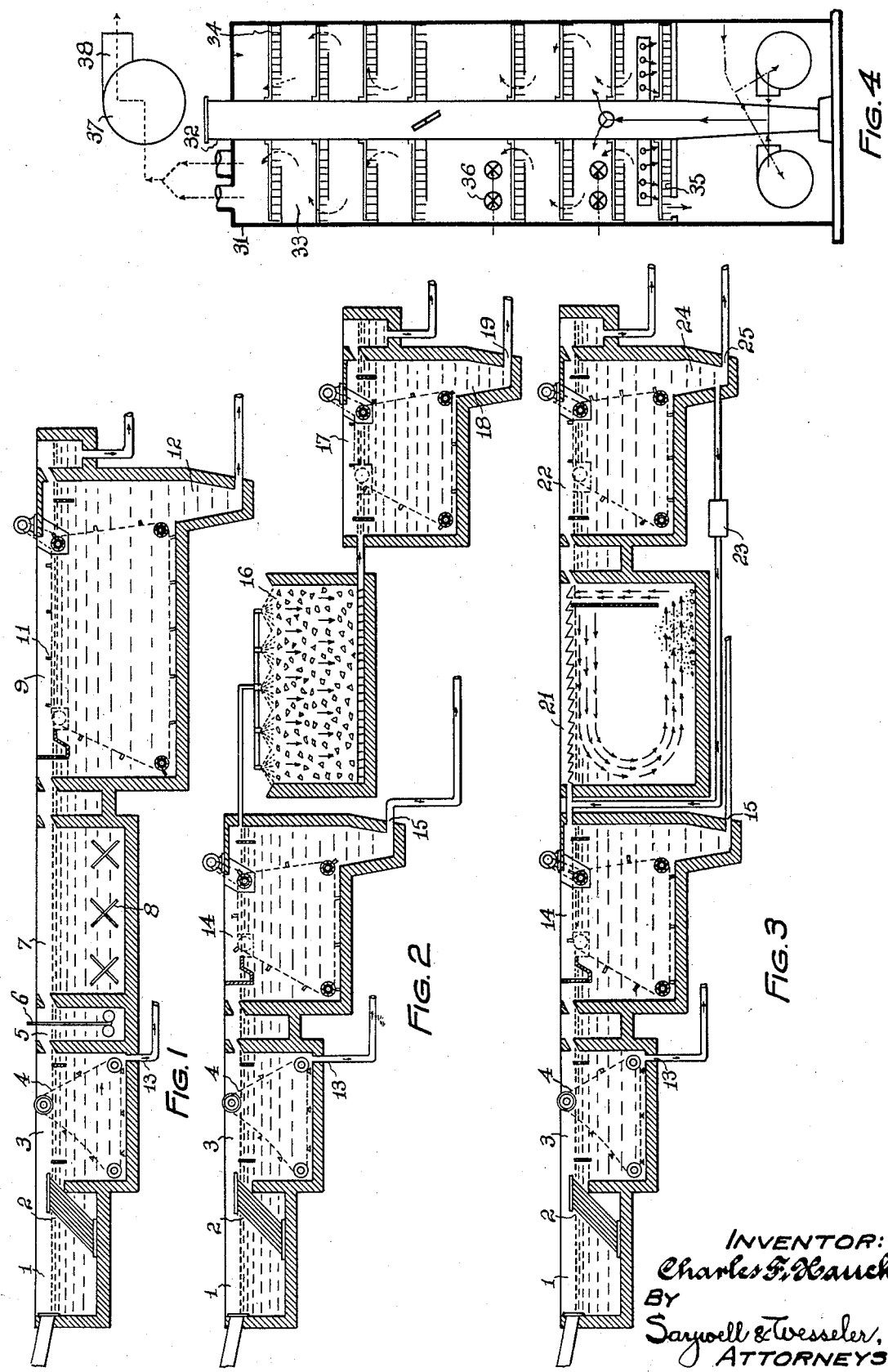

Patented Feb. 29, 1944

2,343,179

UNITED STATES PATENT OFFICE 2,343,179

ABRASIVE MATERIAL

Charles F. Hauck, Cleveland, Ohio

Application May 15, 1941, Serial No. 393,688

4 Claims. (Cl. 51—293)

This invention, as indicated, relates to sanitary and industrial wastes and products resulting therefrom. More particularly, it comprises the conditioning of sewage waste to bring about the production of certain standardized products available as raw material for various industrial uses. The invention also includes certain products adapted to be used directly for frictional and abrasive purposes, and also as body material for various articles of manufacture. The invention also includes the production of material having a high proportion of iron combined with embedded silica and other mineral constituents making the same of high value in connection with furnace charges wherein fluxing material as well as additional metal suitable for alloying and the like is made available at extremely low cost. The invention also includes the preconditioning of sludge material derived from sewage and industrial wastes including the addition of elements thereto enhancing the value of the final product and providing reaction characteristics satisfactory for various furnace linings of acid or basic reaction. The invention also includes control of the moisture content, degree of concentration, stages of removal of solids, control of particle size, control of the period and character of sludge treatment, and control of proportioning and incineration of single sludges or combinations thereof.

The principal object of the present invention is to produce material suitable for industrial uses of high quality and of standardized characteristics from sewage and industrial wastes at extremely low cost.

Another object of the invention is to produce cheap silicious iron ore suitable for furnace charging in steel manufacture.

Another object of the invention is to produce a granulated material at low cost and with high abrasive and frictional characteristics.

Another object of the invention is to provide a combined flux and ore raw material for specialized uses, such as the production of high silicon steel in electric furnaces.

Another object of the invention is to provide a granulated material of mildly abrasive character and readily bonded with standard bonding material for use in industrial operations.

Another object of the invention is to provide a lens-grinding compound of high quality.

Another object of the invention is to provide a high grade cement, with superior hydraulic qualities.

Another object of the invention is to provide a material to form part of a plastic composition of low cost.

Another object of the invention is to make available for industrial use standard, dependable, raw materials free of objectionable elements and at extremely low cost.

Another object of the invention is to bring about the reclaiming of minerals and metals from sewage and industrial wastes and conditioning such materials for specialized operations.

Other and further objects of the invention will appear in the course of the following description.

To the accomplishment of the foregoing and related ends, said invention, then, consists of the means hereinafter fully described and particularly pointed out in the claims, the annexed drawing and the following description setting forth in detail certain means embodying the invention, such disclosed means constituting, however, but several of various forms in which the principle of the invention may be used.

In said annexed drawing:

Fig. 1 is a flow diagram illustrating sludge production including the step of chemical precipitation.

Fig. 2 is a similar diagram showing sludge production with the use of a trickling filter.

Fig. 3 is a flow diagram illustrating sludge production through activation.

Fig. 4 is an incinerator flow sheet.

As is clearly shown in Figure 1 of the drawing the incoming sewage is received in a tank 1 and passes through a bar screen 2, and thereafter into a grit channel 3 in which grit is removed, which may have a collector 4, and the liquid thereafter is carried into a tank 5 having a mixer 6 to incorporate various chemicals therewith, the liquid being carried into a tank 7 having flocculators 8 after which the liquid flows into a sludge collecting tank 9 having a chain belt 11 above which grease and skimmings are collected, the liquid sludge being recovered at a sludge pocket 12 at a lower level of said tank and carried thence to a point of incineration or digestion. The grit, it will be noted, may be removed from a grit channel outlet 13 in the bottom of the grit channel 3 and carried to a point of discharge for incineration, if desired.

A somewhat similar arrangement is shown in Figure 2 wherein the chemical steps are omitted and the liquid from the grit channel flows into a primary sedimentation tank 14, the sludge being removed from the bottom through an outlet 15 for incineration, or digestion with subsequent incineration. The liquid from the upper portion of the tank is carried to a filter 16 and from the bottom of the filter bed flows to a final sedimentation tank 17 provided with a sludge pocket 18 and an outlet 19 to carry the sludge to a point of digestion or incineration.

In the form of construction shown in Figure 3 the filter is omitted and an aerating tank 21 is provided, the sludge moving through a channel from the tank into a final sedimentation tank 22 whence part of the activated sludge is recirculated by a pneumatic lift or pump 23 back to the aerating tank. The sludge is removed from a sludge pocket 24 at the base of the tank and is carried through an outlet 25 to a point of incineration or digestion.

The process of incineration may take various forms. There may be burning upon a hearth wherein the sludge passes progressively from one hearth of a series to another positioned at a point of higher temperature and finally passing to a point of discharge after complete incineration. The time of detention of one type of sludge undergoing treatment may differ from that of others in order to bring about certain physical characteristics in the final ash. It may also be be used as a means for varying the chemical characteristics of the sludge under treatment.

The burning also may take place in suspension, the discharge being through an ash outlet at the base of the apparatus. The incineration may also take place by direct heating on a fire bank, the fuel bed being maintained through control of feeding at the proper temperature.

The apparatus for carrying on incineration of the type first referred to upon a series of hearths is illustrated in Figure 4 of the drawing wherein the furnace 31 is provided with a central rotating shaft 32 preferably hollow and air cooled and supporting over each hearth steering elements serving to progressively move the sludge to a point of discharge to the hearth below. The steering elements 33 may be in the form of rabble teeth of suitable size and shape. The sludge moves progressively to hearths of higher temperature from the uppermost hearth 34 to the lowermost hearth 35, and over any desired number of intermediate hearths. A plurality of gas burners 36 are provided which discharge heated air in an upward direction to a point of discharge controlled by a hot gas fan 37. If necessary the discharge gases may be rendered wholly unobjectionable by treatment in a deodorizing unit 38 preliminary to discharging into the air.

The sludges treated in the apparatus above described will have different characteristics even though identical incoming sewage is used as the raw material. This is particularly true where chemical precipitation and treatment is carried on as shown in Figure 1. Thus, the ratio of calcium and magnesium in reference to silica may be controlled and conditioning agents may be used to yield a maximum of iron and a minimum of phosphorus and unfluxed elements. One of the substances added to the sewage is ferric chloride and this alone greatly increases the ratio of iron to the balance providing a furnace raw material having acid reaction characteristics and a high ratio of silica to calcium. Other chemicals which can be added as substances for sewage treatment may include copperas, or lime, or clay. Lime reduces the net silica. In this manner a furnace raw material having basic reaction characteristics may be provided. Where the sludge is to be conditioned for use as a filler for plastics it may be desirable to omit the addition of ferric chloride and to use lime only. In such case the red iron coloring effect will be avoided. However, where a brick colored effect is desired in the plastics it is unnecessary to add any red coloring material other than the iron used in the sewage treatment process.

As stated, the ash from the reduction and incineration process provides an exceptional source for certain industrial materials, being inexpensive waste material and convertible into material comparable in quality to high cost products derived from present standard sources. Thus the field for such material is of an expanding character as the matter of low cost is accompanied by an unusually high quality of product.

All of the potential applications of this processed material cannot be outlined in detail but certain of such applications are of such immediate importance that they will be described with some particularity.

The waste material, or ash, is also exceptionally suitable for the production of a lens-grinding composition. A coarse lens-grinding material may be made inexpensively from the incinerator ash by—

A. Selecting from the available sludges, one with the highest proportions of iron oxide and aluminum oxide along with a fair proportion of finely divided silica.

B. Adding ferric chloride to the selected sludge exclusively as a conditioner to enhance the value of the end product as a polishing agent.

C. De-watering and incinerating slowly between 1200 and 1400 degrees F. until all combustible material has been removed. When the sewage solids are burnt in suspension, the furnace conditions must be controlled, that is, the rate of feed, composition of feed, and temperature of combustion must be regulated to insure a uniform and thorough process of burning.

D. After screening to eliminate all except the portion passing through a 200 mesh screen, the ash is mixed with sulphuric acid or with oil to form the grinding paste. To provide a grinding mixture of greater fineness a second screening through a finer mesh is necessary before mixing the material with the sulphuric acid or with the oil to form the grinding paste.

Another industrial use of the processed ash, having wide utility, is as a finishing or special purpose cement.

In making friction elements for power transmission and braking mechanisms a durable surface of long service life can be fabricated with ash from sewage disposal. The selected ash should preferably have a silica content of approximately 10 to 30%, a substantial amount of aluminum oxide, and iron in sufficient amount to act as a binder. The same ash may be used in a plastic composition for a like purpose. In either case the material would be subjected to heat and pressure to give the material fine grain and a high degree of strength and durability. Additions of metallic powders, such as copper, tin, lead, and the like, to the ash, when subjected to heat and perssure will sinter and agglomerate the mass, and provide a friction element adapted for heavy duty service.

Other modes of applying the principle of my invention may be employed instead of those explained, change being made as regards the means and steps herein disclosed, provided the means stated by any of the following claims or the equivalent of such stated means be employed.

I therefore particularly point out and distinctly claim as my invention:

1. A product comprising material recovered in the form of ash from sewage waste, said recovered material having as a major content spongy iron with embedded silica and aluminum oxide in predetermined controlled ratio and substantially free of phosphorus.

2. A product comprising material recovered in the form of ash from sewage wastes, said recovered material having as a major content spongy iron with embedded silica and aluminum oxide in predetermined controlled ratio and substantially free of phosphorus, in the form of granular material held together by a binder of copper alloy, to provide material for abrasive and friction surface members.

3. An abrasive substance comprising material recovered in the form of ash from sewage sludge, such recovered material having high iron content as sewage waste from industrial plants enhanced with ferric chloride through sewage treatment, and finely disintegrated silica and aluminum oxide as sewage waste from surface drainage areas in predetermined controlled ratio, said product being reduced to granular form.

4. An abrasive substance comprising material recovered in the form of ash from sewage sludge, such recovered material having high iron content as sewage waste from industrial plants enhanced with ferric chloride through sewage treatment, and finely disintegrated silica and aluminum oxide as sewage waste from surface drainage areas in predetermined controlled ratio, said product being reduced to granular form through controlled incineration and held in a tenacious binder for frictional and abrasive purposes.

CHARLES F. HAUCK.